United States Patent
Oleske et al.

(10) Patent No.: US 11,041,810 B2
(45) Date of Patent: Jun. 22, 2021

(54) SILICONE DETECTABILITY UNDER UV LIGHT

(71) Applicant: United Technologies Corporation, Farmington, CT (US)

(72) Inventors: Katharine Oleske, Vernon, CT (US); John Harner, Vernon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 217 days.

(21) Appl. No.: 16/434,946

(22) Filed: Jun. 7, 2019

(65) Prior Publication Data

US 2020/0386686 A1     Dec. 10, 2020

(51) Int. Cl.
| | |
|---|---|
| *G01N 21/77* | (2006.01) |
| *C08K 5/00* | (2006.01) |
| *C08L 83/04* | (2006.01) |
| *G01N 21/29* | (2006.01) |
| *G01N 21/33* | (2006.01) |

(52) U.S. Cl.
CPC .......... *G01N 21/77* (2013.01); *C08K 5/0041* (2013.01); *C08L 83/04* (2013.01); *G01N 21/29* (2013.01); *G01N 21/33* (2013.01)

(58) Field of Classification Search
CPC ........ G01N 21/29; G01N 21/33; G01N 21/77; C08K 5/0041; C08L 83/04; C08L 83/06; C08L 83/08; C09D 5/004; C09D 7/41; C09D 183/04; C09D 183/06; C09D 183/08; C08G 77/04; C08G 77/045; C08G 77/12; C08G 77/14; C08G 77/16; C08G 77/18; C08G 77/20; C08G 77/22; C08G 77/38; C08G 77/382; C08G 77/385; C08G 77/388; C08G 77/392; C08G 77/395; C08G 77/398; C08G 77/70; C08G 77/80
See application file for complete search history.

(56) References Cited

U.S. PATENT DOCUMENTS

| | | | |
|---|---|---|---|
| 4,250,382 A | 2/1981 | Libby | |
| 5,707,587 A | 1/1998 | Blanchard et al. | |
| 7,790,292 B2* | 9/2010 | Colborn | C08L 83/10 |
| | | | 428/447 |
| 2004/0067590 A1 | 4/2004 | Elhard et al. | |
| 2011/0217544 A1 | 9/2011 | Young et al. | |
| 2014/0045969 A1 | 2/2014 | Klapdohr et al. | |
| 2016/0038628 A1 | 2/2016 | Klofta et al. | |
| 2016/0123881 A1* | 5/2016 | Shukla | G01N 21/8422 |
| | | | 436/2 |

FOREIGN PATENT DOCUMENTS

| | | |
|---|---|---|
| EP | 0720015 A2 | 7/1996 |
| EP | 2679986 A2 | 1/2014 |
| EP | 2695910 A1 | 2/2014 |
| RU | 2645431 C1 | 2/2018 |

OTHER PUBLICATIONS

Extended European Search Report for EP Application No. 20178556.5, dated Nov. 4, 2020, pp. 9.

* cited by examiner

*Primary Examiner* — Jennifer Wecker
*Assistant Examiner* — Kathryn Elizabeth Limbaugh
(74) *Attorney, Agent, or Firm* — Kinney & Lange, P. A.

(57) ABSTRACT

A method of detecting a presence, location, quality, thickness or cure extent of an organopolysiloxane includes applying an organopolysiloxane on a component, which includes a hydrochromic pigment. The method includes exciting the hydrochromic pigment with a light source and measuring the emissions of the hydrochromic pigment.

20 Claims, 1 Drawing Sheet

SILICONE DETECTABILITY UNDER UV LIGHT

BACKGROUND

The present disclosure relates generally to silicone primers. More specifically, the present disclosure relates to detection of the application and cure state of silicone primers.

Many components in an aircraft are made up of multi-layer systems of materials to impart desired characteristics to the components such as, for example, durability, heat resistance, corrosion resistance, and light weight. When these components are damaged or suffer from delamination, the components can be repaired to extend the component's useful life. One common layer found in these components is a primer layer used to promote adhesion between two structural layers. As such, a component repair process can include reapplication of the primer layer.

Most organopolysiloxane compositions, including organopolysiloxane primers, are cured by reacting with moisture in the air to form crosslinks at room temperature. The time to cure can be affected by, for example, the amount of humidity in the air, the ambient temperature, and the amount of composition applied. Regardless, the curing process at room temperature proceeds gradually, and it can be difficult to determine when the curing process has completed.

One approach to determine the cure status of an organopolysiloxane composition is to add a hydrochromic pigment to the composition which changes color in visible light based on a condensation state of the hydrochromic pigment.

SUMMARY

A method of detecting a presence, location, quality, thickness or cure extent of an organopolysiloxane includes applying an organopolysiloxane on a component, which includes a hydrochromic pigment. The method includes exciting the hydrochromic pigment with a light source and measuring the emissions of the hydrochromic pigment.

BRIEF DESCRIPTION OF THE DRAWINGS

FIG. 1A is a perspective view of an organopolysiloxane applied on a component without a hydrochromic pigment. FIG. 1B is a perspective view of an organopolysiloxane applied on a component with a hydrochromic pigment.

FIG. 2A is a perspective view of an organopolysiloxane applied on a component without a hydrochromic pigment. FIG. 2B is a perspective view of an organopolysiloxane applied on a component with a hydrochromic pigment.

DETAILED DESCRIPTION

Adding condensation based hydrochromic pigments to an organopolysiloxane composition can help determine the cure extent of the organopolysiloxane when applied on certain substrates and when sufficient visible light is available. However, the hydrochromic pigments may not be visible by the naked eye when the organopolysiloxane composition is applied to certain substrates, under low light conditions, or applied as a thin layer. For example, a hydrochromic pigment may be readily visible when contrasted against a paper background, however, the same color change can be difficult to detect against a metallic background.

Additionally, a hydrochromic pigment may be readily visible when the amount of visible light is plentiful, but when lighting conditions are poor, the same hydrochromic pigment can be difficult to detect. For example, many organopolysiloxane applications are not performed in controlled environments, such as a factory, home, or business. Specifically, in the aerospace industry repair applications can be performed in the field. Furthermore, the repair may take place, for example, on wing where lighting conditions can be poor. The hydrochromic pigment may be difficult to detect, for example, using a flashlight as a primary light source.

Additionally, a hydrochromic pigment may be readily visible when applied as a thick layer. However, when applied as a thin layer the hydrochromic pigment may be difficult to detect. For example, an organopolysiloxane composition can be used as a primer and be applied only as a thin layer. Although the concentration of hydrochromic pigments can be increased to help overcome these problems, higher concentrations of hydrochromic pigments can decrease the effectiveness of other desirable chemistries in the composition. For example, a primer with high concentrations of hydrochromic pigments may not promote adhesion as effectively between a metal substrate and another material compared to a primer with lower concentrations of hydrochromic pigments.

Not only can a hydrochromic pigment in an organopolysiloxane composition be difficult to detect, but a corresponding color change as the organopolysiloxane cures, can likewise, be difficult to detect.

Figure 1A:
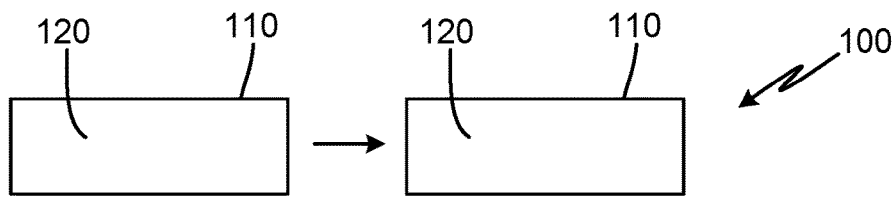
FIGS. 1A and 1B are illustrations of an organopolysiloxane applied on a component before and after the organopolysiloxane has cured.
Figure 1B:
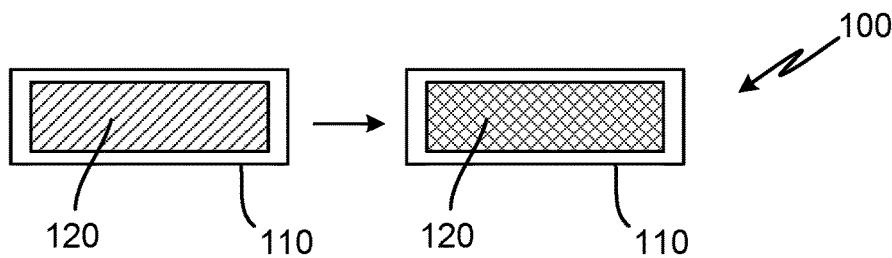

Herein is disclosed a method for visually determining the presence, quality and cure extent of an organopolysiloxane using a UV light source. FIGS. 1A and 1B are illustrations of in process component 100, which includes component 110 and organopolysiloxane 120 applied on component 110 before and after organopolysiloxane 120 has cured using a UV light source to excite in process component 100. FIG. 1A shows organopolysiloxane 120 as not visible by the naked eye when applied on component 110 without a hydrochromic pigment.

Organopolysiloxane 120 can be visible by the naked eye when it is first applied. However, as organopolysiloxane 120 dries, organopolysiloxane 120 becomes nearly impossible to detect by the naked eye. In other words, when organopolysiloxane 120 without a hydrochromic pigment is applied to component 110, a user can have a difficult time determining where organopolysiloxane 120 has been applied on component 110 and a difficult time determining the cure extent of organopolysiloxane 120 especially in low visible light conditions or when organopolysiloxane 120 is applied as a thin layer compared to an applied layer of organopolysiloxane 120 that includes a hydrochromic and/or permanent pigment.

Furthermore, even when a hydrochromic pigment is added to organopolysiloxane 120 the color of the hydrochromic pigment can be difficult to detect by the naked eye when organopolysiloxane 120 is applied to a metallic surface, as a thin layer, or under low light conditions and using a standard visible light source to excite the hydrochromic pigment. However, using a UV light source to excite the hydrochromic pigment can enable detection by the naked eye of the color of the hydrochromic pigment. Although not wanting to be limited by theory, it is believed that the hydrochromic pigment absorbs energy at certain frequencies and then emits the energy at different frequencies. For example, aluminum is a very reflective metal. As such, using visible light to excite the hydrochromic pigment and looking for a color change in the same region as the reflected light may make detection of the color change more difficult. Whereas, using UV light to excite the hydrochromic pigment shifts the reflected light region making detection in the visible light range much easier and enables detection when organopolysiloxane 120 is applied to a metallic or composite surface, as a thin layer, or under low light conditions.

A user can more easily identify where on component 110 organopolysiloxane 120 has been applied and the cure extent of organopolysiloxane 120 when using a UV light source compared to a standard visible light source to excite the hydrochromic pigment. Hydrochromic pigment can be any color indicating compound sensitive to water. For example, the hydrochromic pigment can be selected from the group consisting of oxazolidines, oxazines, spiropyrans, or polydiacetylenes.

FIG. 1B shows organopolysiloxane 120 with a hydrochromic pigment as having a first color when applied on component 110 and having a second color when organopolysiloxane 120 has cured. A particular hydrochromic pigment can be selected for a particular use. For example, hydrochromic pigment first color can be green when applied on component 110 and turn into second color, red, when organopolysiloxane 120 has cured. Using a single color-changing hydrochromic pigment allows a user to visualize both the presence and the cure extent of organopolysiloxane 120 while minimizing the number and concentration of additives to an organopolysiloxane system. For example, hydrochromic pigment can be added in quantities from 0.04 to 5.0 wt %, inclusive. Hydrochromic pigment can be added from 0.1 to 1.0 wt %, inclusive. Hydrochromic pigment can be added from 0.2 to 0.5 wt %, inclusive. Any additional pigments can also be added from 0.04 to 5.0 wt %, from 0.1 to 1.0 wt %, and from 0.2 to 0.5 wt %, inclusive.

Alternatively, hydrochromic pigment first color can be any color which dissipates as organopolysiloxane 120 cures, enabling visualization of the application site until organopolysiloxane 120 has cured. Alternatively, a hydrochromic pigment and a permanent pigment can be added to organopolysiloxane 120. On the one hand, the permanent pigment can have a permanent color irrespective of moisture content and cure extent, as such, allowing visualization of application quality and thickness throughout the process from application to cure of organopolysiloxane 120. On the other hand, the hydrochromic pigment can change color as organopolysiloxane 120 is exposed to moisture, indicating the cure extent.

The cure state of organopolysiloxane 120 can be qualitatively assessed by determining the amount of color change a hydrochromic pigment has undergone. For example, a hydrochromic pigment which only has a slight color change can indicate that the cure process has not progressed very far, whereas, a hydrochromic pigment which has a more intense color change can indicate a cure process that is more complete.

Similarly, the thickness level of organopolysiloxane 120 applied to a surface can be estimated based on the intensity of the detected color of a hydrochromic pigment. In other words, a thin layer of organopolysiloxane 120 applied to a surface may have a less intense color compared to a thicker layer of organopolysiloxane 120 applied to the same surface. The qualitative assessment or intensity of the color level can be determined by any means known in the art. For example, the color intensity could be determined using either absorption or emission techniques including a colorimeter, spectrometer, solely by a user's naked eye, or by a user comparing the color intensity to color strips, which correspond to known thicknesses or known cure extents of organopolysiloxane 120.

Using a UV light source for detection of a hydrochromic pigment allows for detection, even for very thin layers of organopolysiloxane 120. For example, organopolysiloxane 120 used as a primer can have a thickness from 0.01 mils to 1.0 mils, inclusive. Organopolysiloxane 120 can have a thickness from 0.05 mils to 0.5 mils, inclusive. Organopolysiloxane 120 can have a thickness from 0.1 mils to 0.2 mils, inclusive.

Figure 2A:
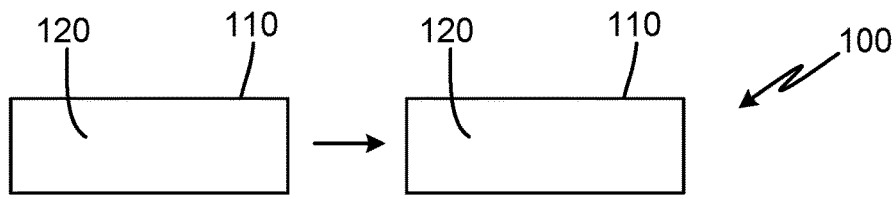
FIGS. 2A and 2B are illustrations of an organopolysiloxane applied on a component without sufficient moisture for the organopolysiloxane to cure.
Figure 2B:
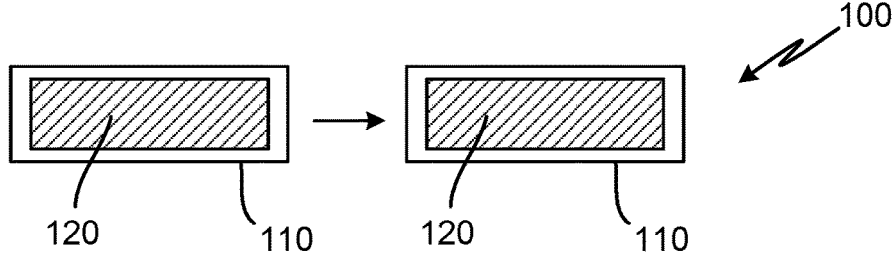

FIGS. 2A and 2B are illustrations of in process component 100, which includes component 110 and organopolysiloxane 120 applied on component 110 excited with a UV light source. FIG. 2A is an illustration of organopolysiloxane 120 applied on component 110 without a hydrochromic pigment and without sufficient moisture for organopolysiloxane 120 to cure. FIG. 2A shows organopolysiloxane 120 as not visible by the naked eye when applied on component 110 without a hydrochromic pigment. Alternatively, organopolysiloxane 120 can be visible by the naked eye, but is less visible compared to organopolysiloxane 120 with a hydrochromic pigment.

FIG. 2B shows organopolysiloxane 120 with a hydrochromic pigment as having a first color when applied on component 110 and retaining that first color when insufficient moisture is present to cure organopolysiloxane 120. In other words, no color change of the hydrochromic pigment is detected, indicating organopolysiloxane 120 is not undergoing the curing process.

The curing of an organopolysiloxane composition varies depending upon ambient conditions. For example, in temperate climates where the humidity, for example, is greater than 50%, the curing process may proceed to completion without addition of a supplemental humidity source. However, in arid climates where the humidity, for example, can be much less than 50%, the curing process may not proceed at all. As such, a supplemental humidity source may be necessary to drive or increase the rate of the curing process. For example, in the field, a humidity tent can be erected around a component where an organopolysiloxane composition has been applied. The humidity levels within the tent can then be temporarily increased until the curing process is complete.

An organopolysiloxane primer with a hydrochromic pigment can be used in environments with unknown humidity levels easing manufacturing and repairing operations. Supplemental humidity sources are used only if the hydrochromic pigment indicates that the curing process is not proceeding or to increase the rate of the curing process. On-wing component assembly and repair is frequently challenging due to space restrictions which complicates the use of supplemental humidity sources. In cases where supplemental humidity is applied, accurate measurement of the increased humidity level is necessary when organopolysiloxanes without a hydrochromic pigment are used to ensure the primer is properly cured. Organopolysiloxanes with hydrochromic pigments ease manufacturability and repair of aircraft components as quality controls can be implemented based on color change rather than on a calculated time at a specific humidity level.

Even when a hydrochromic pigment is added to organopolysiloxane 120 whether or not the color of the hydrochromic pigment is changing can be difficult to determine by the naked eye when organopolysiloxane 120 is applied to a metallic surface, as a thin layer, or under low light conditions and using a standard visible light source to excite the hydrochromic pigment. However, using a UV light source to excite the hydrochromic pigment can enable detection by the naked eye of whether or not the color of the hydrochromic pigment is changing. A user can more easily identify where on component 110 organopolysiloxane 120 has been applied, the cure extent, and thickness level of organopolysiloxane 120 when using a UV light source compared to a standard visible light source to excite the hydrochromic pigment.

Discussion of Possible Embodiments

The following are non-exclusive descriptions of possible embodiments of the present invention.

A method of detecting a presence, location, quality, thickness or cure extent of an organopolysiloxane includes applying an organopolysiloxane with a hydrochromic pigment on a component. The method includes exciting the hydrochromic pigment with a light source and measuring emissions of the excited hydrochromic pigment.

The method of the preceding paragraph can optionally include, additionally and/or alternatively, any one or more of the following features, configurations and/or additional components:

The method includes determining the presence and location of application of the organopolysiloxane using the measured emissions of the excited hydrochromic pigment.

The method includes determining the thickness of the organopolysiloxane using the measured emissions of the excited hydrochromic pigment.

The method includes determining the cure extent of the organopolysiloxane using the measured emissions of the excited hydrochromic pigment.

The method includes curing the organopolysiloxane by exposing the organopolysiloxane to humidity.

Curing the organopolysiloxane is achieved by exposing the organopolysiloxane to atmospheric conditions.

Curing the organopolysiloxane is achieved by exposing the organopolysiloxane to a supplemental humidity source.

The organopolysiloxane includes a permanent pigment.

The method includes exciting the permanent pigment with a light source, measuring emissions of the excited permanent pigment, and determining the presence and location of application of the organopolysiloxane using the emissions of the excited permanent pigment.

The organopolysiloxane is a primer and has a thickness from 0.01 to 1.0 mil, inclusive.

The hydrochromic pigment has a wt % from 0.04 to 5.0, inclusive.

An aircraft component manufactured or repaired using any of the processes above.

A method of repairing an aircraft component includes removing at least one damaged layer from the aircraft component, including an organopolysiloxane. The method includes applying an organopolysiloxane with a hydrochromic pigment on a component and exposing the organopolysiloxane to humidity to cure the organopolysiloxane. The method includes exciting the hydrochromic pigment with a light source and measuring emissions of the excited hydrochromic pigment.

The method of the preceding paragraph can optionally include, additionally and/or alternatively, any one or more of the following features, configurations and/or additional components:

The organopolysiloxane includes a permanent pigment.

The method includes exciting the permanent pigment with a light source, measuring emissions of the excited permanent pigment, and determining the presence and location of application of the organopolysiloxane using the emissions of the excited permanent pigment.

The method includes determining the thickness level of the applied organopolysiloxane using the measured emissions of the excited permanent pigment.

The method includes determining the cure extent of the organopolysiloxane, using the measured emissions of the excited hydrochromic pigment.

The organopolysiloxane is a primer and has a thickness from 0.01 to 1.0 mil, inclusive.

The hydrochromic pigment has a wt % from 0.04 to 5.0, inclusive.

An aircraft component manufactured or repaired using any of the processes above.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detecting a presence, location, quality, thickness or cure extent of an organopolysiloxane, the method comprising:
applying an organopolysiloxane on a component, wherein the organopolysiloxane includes a hydrochromic pigment;
exciting the hydrochromic pigment with a light source, forming an excited hydrochromic pigment; and
measuring emissions of the excited hydrochromic pigment.

2. The method of claim 1 and further comprising determining the presence and location of application of the organopolysiloxane using the measured emissions of the excited hydrochromic pigment.

3. The method of claim 1 and further comprising determining the thickness of the organopolysiloxane using the measured emissions of the excited hydrochromic pigment.

4. The method of claim 1 and further comprising determining the cure extent of the organopolysiloxane using the measured emissions of the excited hydrochromic pigment.

5. The method of claim 1 and further comprising curing the organopolysiloxane by exposing the organopolysiloxane to humidity.

6. The method of claim 5, wherein curing the organopolysiloxane is achieved by exposing the organopolysiloxane to atmospheric conditions.

7. The method of claim 5, wherein curing the organopolysiloxane is achieved by exposing the organopolysiloxane to a supplemental humidity source.

8. The method of claim 1, wherein the organopolysiloxane includes a permanent pigment.

9. The method of claim 8 and further comprising:
exciting the permanent pigment with a light source, forming an excited permanent pigment;
measuring emissions of the excited permanent pigment; and determining the presence and location of application of the organopolysiloxane using the emissions of the excited permanent pigment.

10. The method of claim 1, wherein the organopolysiloxane is a primer and has a thickness from 0.01 to 1.0 mil, inclusive.

11. The method of claim 1, wherein the hydrochromic pigment has a wt % from 0.04 to 5.0, inclusive.

12. An aircraft component manufactured or repaired using the process of claim 1.

13. A method of repairing an aircraft component, the method comprising:
    removing at least one damaged layer from the aircraft component, including an organopolysiloxane;
    applying an organopolysiloxane on a component, wherein the organopolysiloxane includes a hydrochromic pigment;
    exposing the organopolysiloxane to humidity to cure the organopolysiloxane;
    exciting the hydrochromic pigment with a light source, forming an excited hydrochromic pigment; and
    measuring emissions of the excited hydrochromic pigment.

14. The method of claim 13, wherein the organopolysiloxane includes a permanent pigment.

15. The method of claim 14 and further comprising:
    exciting the permanent pigment with a light source, forming an excited permanent pigment;
    measuring emissions of the excited permanent pigment; and
    determining the presence and location of application of the organopolysiloxane using the emissions of the excited permanent pigment.

16. The method of claim 14 and further comprising determining the thickness level of the applied organopolysiloxane, using the measured emissions of the excited permanent pigment.

17. The method of claim 14 and further comprising determining the cure extent of the organopolysiloxane, using the measured emissions of the excited hydrochromic pigment.

18. The method of claim 13, wherein the organopolysiloxane is a primer and has a thickness from 0.01 to 1.0 mil, inclusive.

19. The method of claim 13, wherein the hydrochromic pigment has a wt % from 0.04 to 5.0, inclusive.

20. An aircraft component manufactured or repaired using the process of claim 13.

* * * * *